(No Model.) 5 Sheets—Sheet 1.
H. W. HEATON.
MOTOR VEHICLE.
No. 593,470. Patented Nov. 9, 1897.
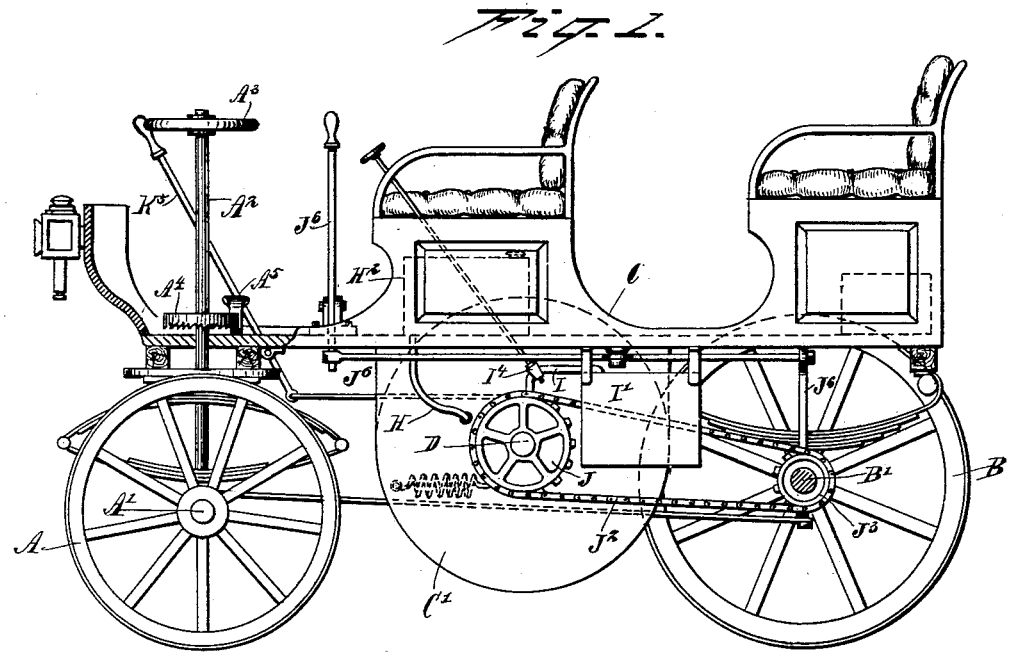
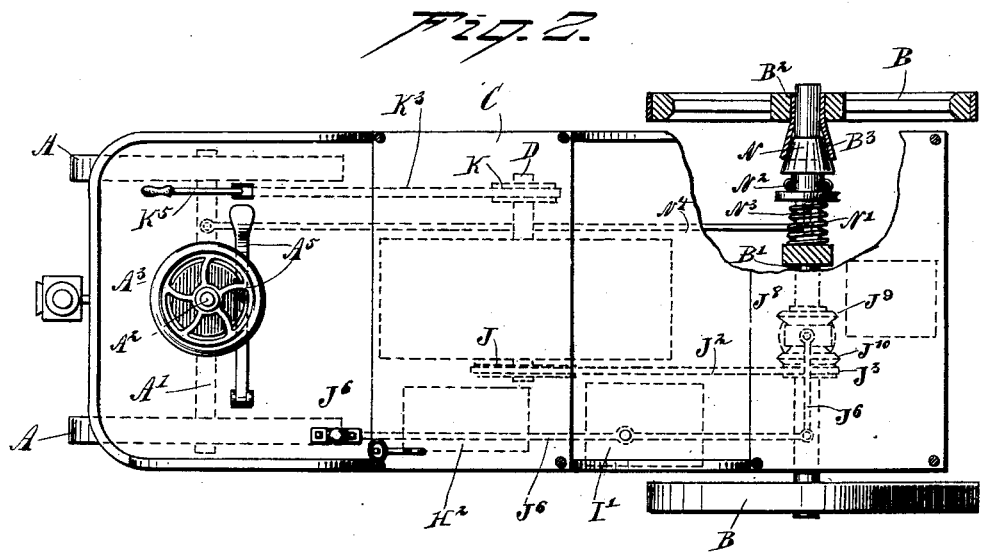
WITNESSES:
INVENTOR
H. W. Heaton
BY
ATTORNEYS.

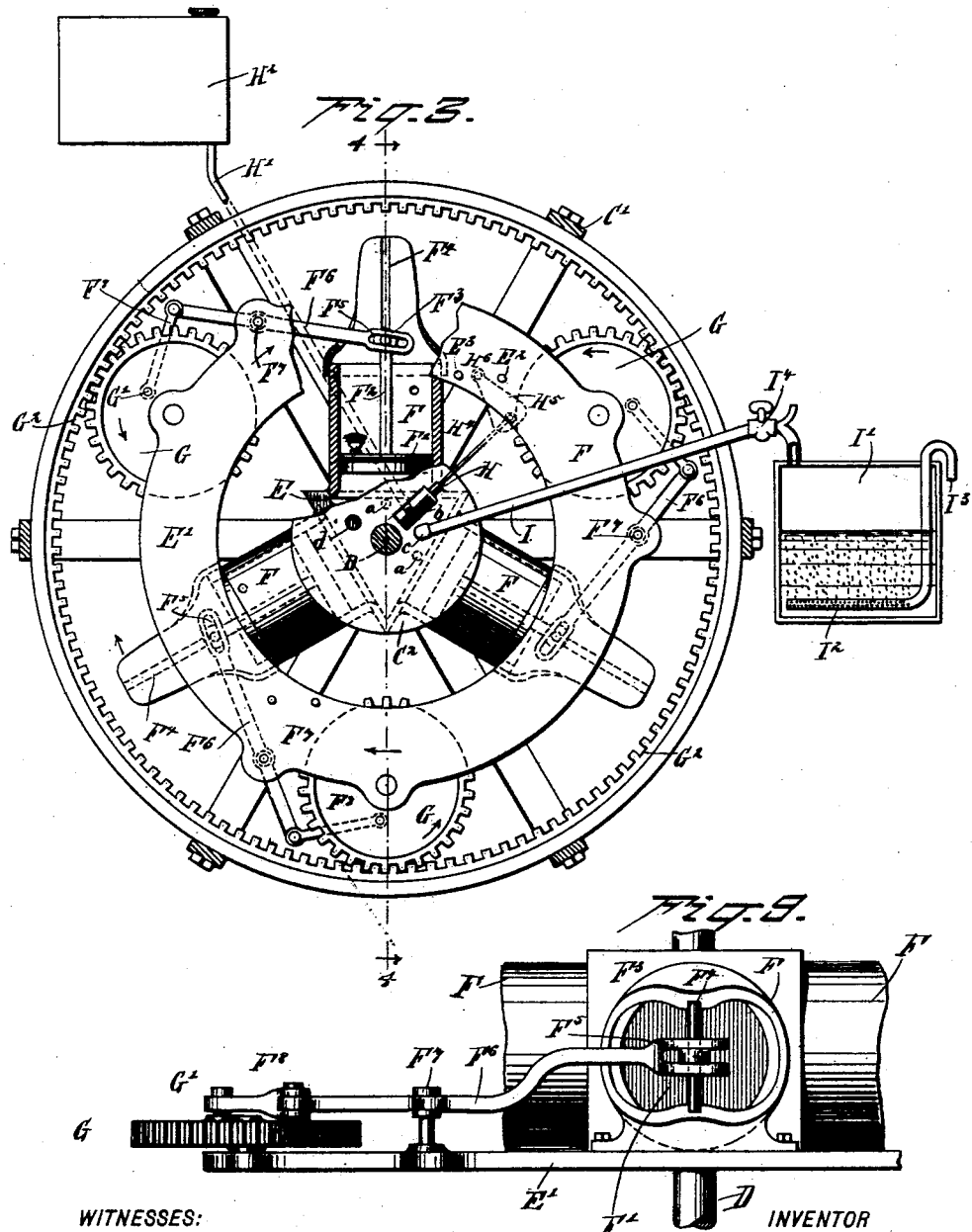

(No Model.) 5 Sheets—Sheet 3.
H. W. HEATON.
MOTOR VEHICLE.
No. 593,470. Patented Nov. 9, 1897.
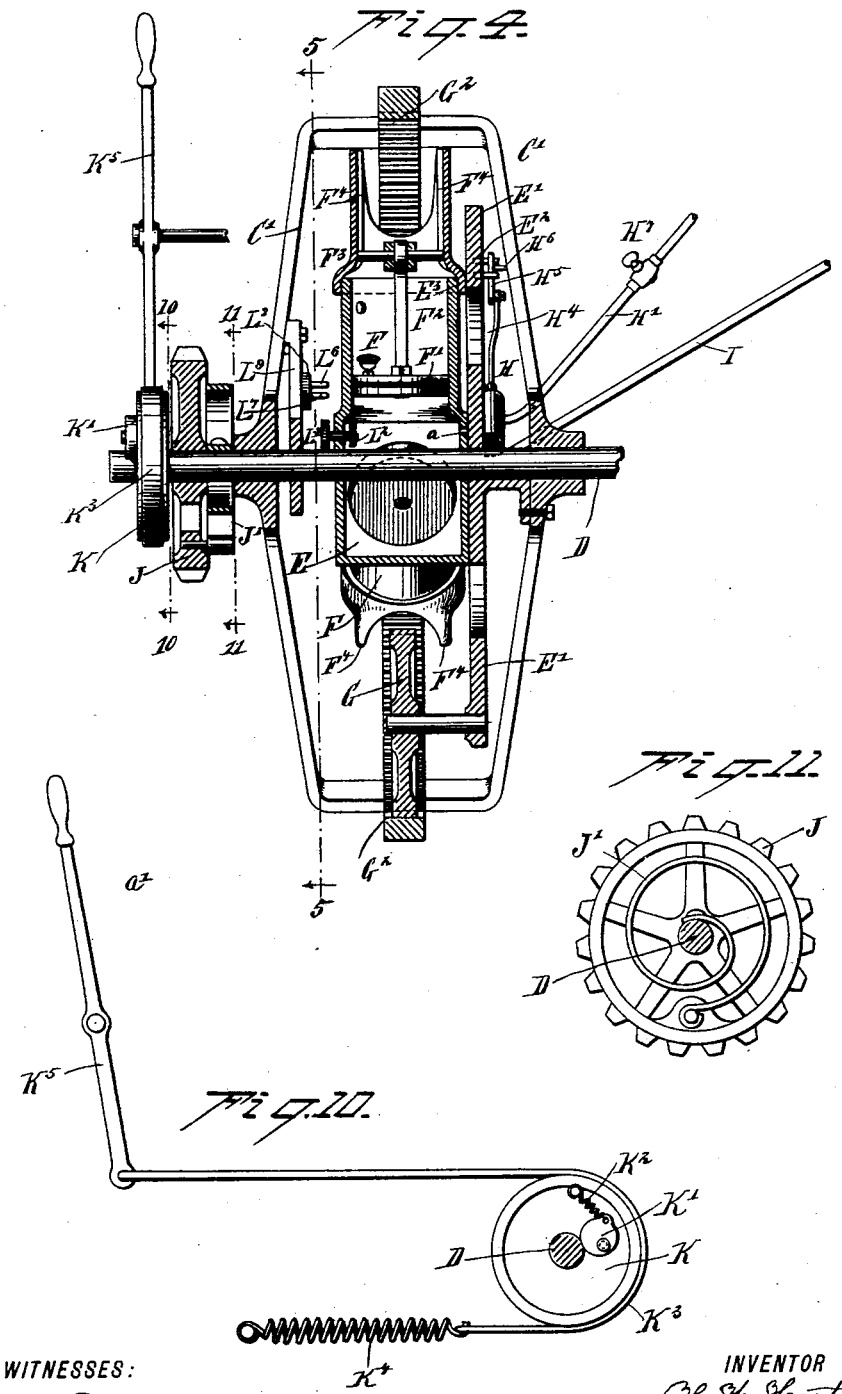
WITNESSES:
INVENTOR
H. W. Heaton
BY
ATTORNEYS (No Model.) 5 Sheets—Sheet 4.
H. W. HEATON.
MOTOR VEHICLE.
No. 593,470. Patented Nov. 9, 1897.
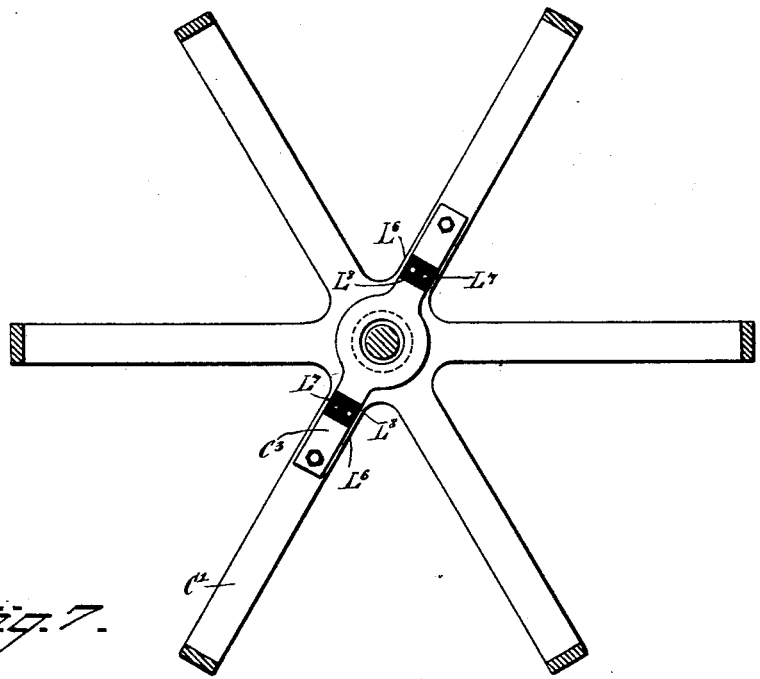
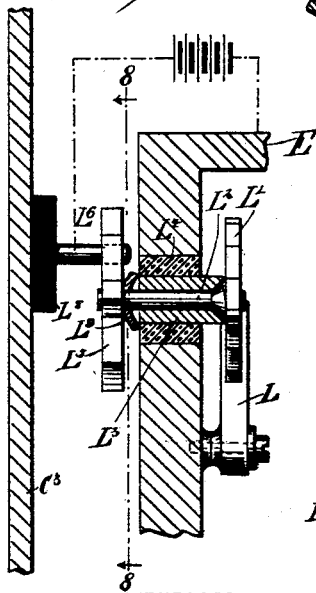
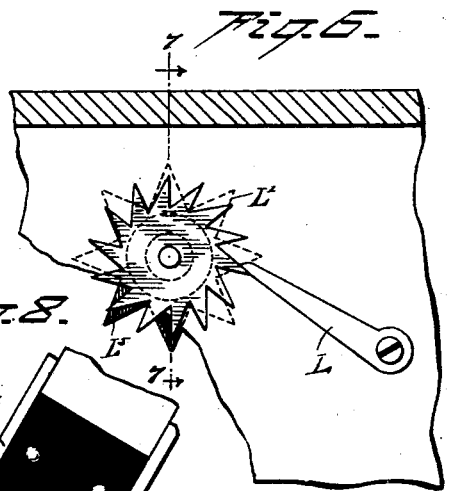
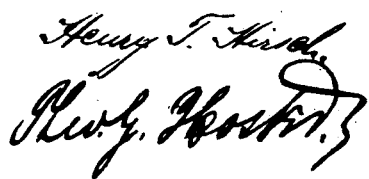
WITNESSES:
INVENTOR
H. W. Heaton.
BY
ATTORNEYS.

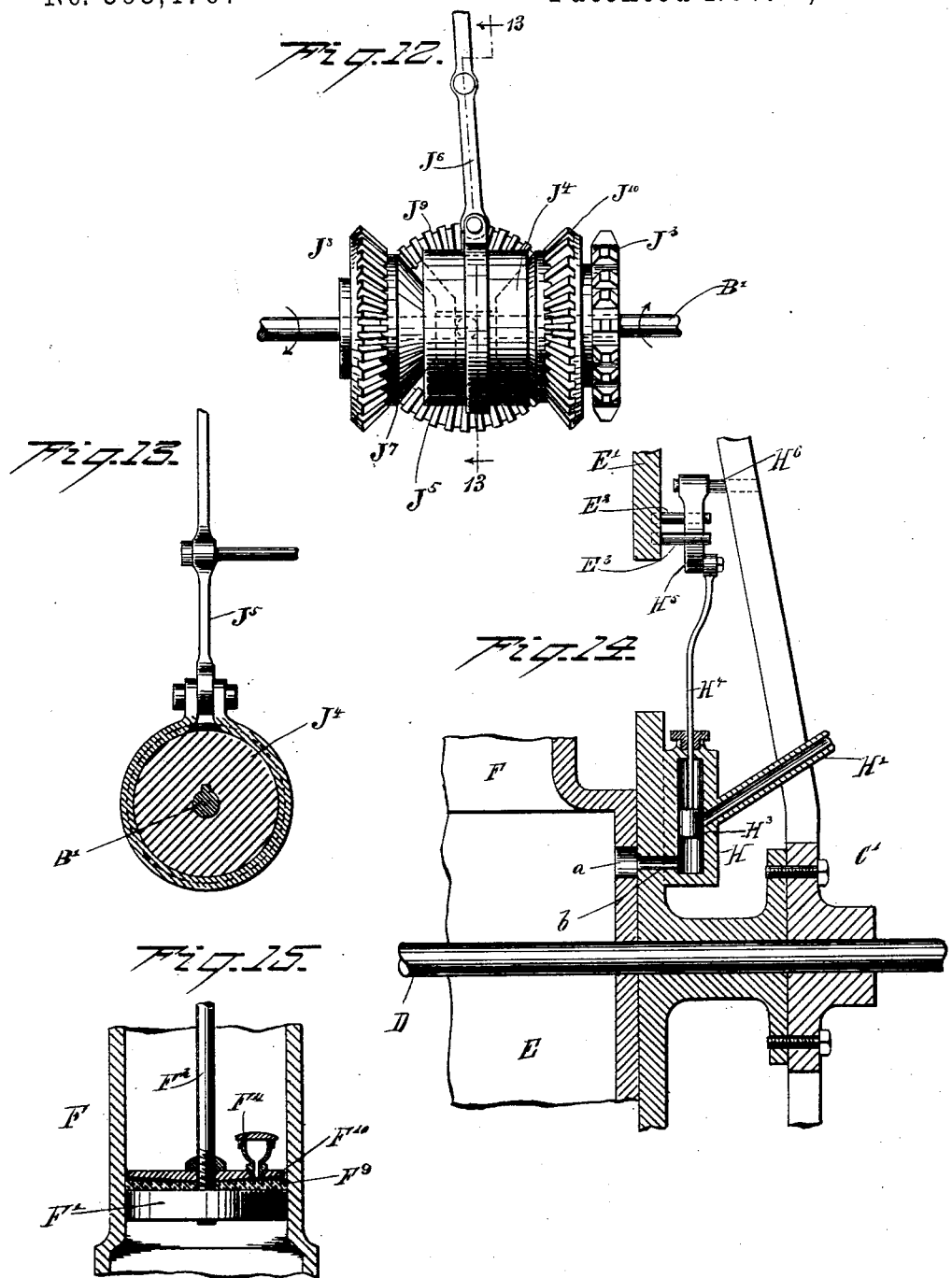

UNITED STATES PATENT OFFICE.

HENRY W. HEATON, OF OLNEYVILLE, RHODE ISLAND.

MOTOR-VEHICLE.

SPECIFICATION forming part of Letters Patent No. 593,470, dated November 9, 1897.

Application filed May 5, 1896. Serial No. 590,284. (No model.)

*To all whom it may concern:*

Be it known that I, HENRY W. HEATON, of Olneyville, in the county of Providence and State of Rhode Island, have invented a new and Improved Motor-Vehicle, of which the following is a full, clear, and exact description.

The object of the invention is to provide a new and improved motor-vehicle which is simple and durable in construction, easily started, stopped, and steered, and arranged to use oil or gas as the motive agent for actuating the motor.

The invention consists principally of a motor comprising a revoluble combustion-chamber from which extend a series of cylinders, the pistons of which are connected by suitable mechanism with gear-wheels rolling off on a fixed gear-wheel.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same with parts broken out. Fig. 3 is an enlarged side elevation of the motor with parts in section. Fig. 4 is a transverse section of the same on the line 4 4 of Fig. 3. Fig. 5 is a sectional side elevation of the motor-frame on the line 5 5 in Fig. 4. Fig. 6 is an enlarged side elevation inside of the igniting device. Fig. 7 is a transverse section of the same on the line 7 7 of Fig. 6. Fig. 8 is a sectional side elevation of the same on the line 8 8 of Fig. 7. Fig. 9 is an enlarged plan view of part of the motor. Fig. 10 is a sectional side elevation of the starting device for the motor, the section being on the line 10 10 of Fig. 4. Fig. 11 is a sectional side elevation of the transmitting-wheel, the section being taken on the line 11 11 of Fig. 4. Fig. 12 is an enlarged sectional end elevation of the reversing mechanism on the vehicle-axle. Fig. 13 is a sectional side elevation of the same on the line 13 13 of Fig. 12. Fig. 14 is an enlarged cross-section of the oil-pump, and Fig. 15 is an enlarged side elevation of the piston-packing.

The improved motor-vehicle, as illustrated in Figs. 1 and 2, is provided with the front wheels A, mounted to rotate loosely on the front or steering axle A', the vehicle being also provided with the rear wheels B, normally secured on the rear or driving axle B', the said axles A' and B' supporting the vehicle-body C.

The motor for propelling the vehicle is arranged on the vehicle-body C and is held in a suitable frame C', secured to the vehicle-body at or near the middle thereof, as is plainly indicated in Figs. 1 and 2. In this frame C' is journaled the transversely-extending main or driving shaft D of the motor, and on this shaft is secured the combustion-chamber E, from which extend a series of cylinders F, opening at their inner ends into the said combustion-chamber, the cylinders being open at their outer ends. As illustrated in Fig. 3, the combustion-chamber E carries three cylinders F, each of which contains a piston F', having a piston-rod F² extending outward and carrying at its outer end a cross-head F³, fitted to slide in suitable guideways F⁴, forming part of the cylinder F. The cross-head F³ is engaged by the slotted end F⁵ of a lever F⁶, fulcrumed at F⁷ on a ring E', secured to the several cylinders F, as is plainly shown in Figs. 3 and 4. The outer end of each lever F⁶ is connected by a link F⁸ with a crank-pin G', held on a gear-wheel G, journaled in suitable bearings on the ring E', the said gear-wheel being in mesh with an internal gear-wheel G², fixed to the frame C'.

It will be seen that when an explosion takes place within the combustion-chamber E at the time the pistons F' are in an innermost position the force of the explosion causes the pistons F' to move outward in their cylinders, so that a swinging motion is given to the levers F⁶ and the several gear-wheels G are rotated. Now, as the gear-wheels G roll off on the internal gear-wheel G², it is evident that this rolling-off motion of the gear-wheel causes the ring E', the cylinders F', and the combustion-chamber E to rotate, whereby a rotary motion is given to the main driving-shaft D, on which the combustion-chamber is secured.

One side of the combustion-chamber E is provided with a number of ports $a$, arranged in a circle, as indicated in dotted lines in Fig. 3, said ports being adapted to alternately register with a port through which passes the charge to be exploded within the combustion-chamber, said ports being also adapted to register with an exhaust-port $d$. Now in case oil is to be used as the motive agent said ports $a$ register with a port $b$, formed in a covering-plate $C^2$, supported from and forming part of the frame $C'$. (See Fig. 4.) This port $b$ opens into the oil-pump H, connected by a pipe $H'$ with a tank $H^2$, containing the oil, said pump being provided with a piston $H^3$, having a piston-rod $H^4$ pivotally connected with an arm $H^5$, fulcrumed at $H^6$ on the frame $C'$. (See Figs. 3, 4, and 14.)

The arm $H^5$ is adapted to be engaged alternately at its upper and lower edges by pins $E^2$ and $E^3$, secured on the ring $E'$, so that a swinging motion is given to the said arm $H^5$ to impart a reciprocating motion to the piston $H^3$. Thus when the ports $a$ and $b$ register with each other the piston $H^3$ will move inward to force the proper amount of oil through the said registering ports into the combustion-chamber E, in which the oil is vaporized by the heat of the combustion-chamber due to previous explosions.

In case vapor is to form the motive agent the ports $a$ register with a port $c$, likewise formed in the plate $C^2$, said port $c$ being connected with the vapor-supply pipe I, connected with the upper end of a carbureter $I'$, in which the oil or like liquid is carbureted, the necessary air being supplied through a perforated pipe $I^2$, extending in the bottom of the carbureter and connected with the outside by a bent pipe $I^3$. In the pipes I and $H'$ are arranged valves $I^4$ and $H^7$ under the control of the operator for shutting off either the oil-supply or the vapor-supply, according to the motive agent to be used.

In order to transmit the rotary motion given to the main driving-shaft D to the rear axle $B'$, I provide said shaft D with a transmitting sprocket-wheel J, held loosely on the shaft and connected therewith by a coil-spring $J'$, fastened at one end to the sprocket-wheel J and at its inner end to the said shaft, as is plainly indicated in Figs. 4 and 11. Over the sprocket-wheel J passes a sprocket-chain $J^2$, also passing over a sprocket-wheel $J^3$, mounted to rotate loosely on the rear axle $B'$. (See Figs. 1, 2, and 12.) On the hub of the sprocket-wheel $J^3$ is secured a cone $J^4$, adapted to be engaged by a double cone-clutch $J^5$, fitted to slide on and mounted to turn with the said axle $B'$, the cone-clutch being under the control of the operator by means of shifting-levers $J^6$. The cone-clutch $J^4$ when in a position shown in Fig. 12 transmits directly the rotary motion given to the sprocket-wheel $J^3$ by means of the cone $J^4$ and the clutch $J^5$; but when it is desired to turn the axle $B'$ in the inverse direction said cone-clutch $J^5$ is shifted to the left to engage it with a cone $J^7$, formed on the hub of a double gear-wheel $J^8$, mounted to rotate loosely on the axle $B^3$ and in mesh with the bevel gear-wheel $J^9$, mounted to turn loosely on a stub supported from the vehicle-body C. This bevel gear-wheel $J^9$ meshes into a bevel gear-wheel $J^{10}$, formed on the hub of the sprocket-wheel $J^3$ next to the cone $J^4$, as is plainly shown in Fig. 12. It is evident that when the clutch $J^5$ is shifted to the left and moved out of frictional contact with the cone $J^4$ and in contact with the cone $J^7$ the rotary motion of the sprocket-wheel $J^3$ is transmitted by the bevel gear-wheels $J^{10}$, $J^9$, and $J^8$ to the cone-clutch $J^5$, but in the inverse direction to that of its previous movement, so that the axle $B'$ is rotated backward, and consequently the vehicle will run backward instead of forward.

In order to start the motor, it is necessary to give the combustion-chamber a few revolutions to cause a charging of the combustion-chamber and igniting thereof, and in order to accomplish this I provide the device shown in detail in Fig. 10. The starting device is provided with a pulley K, secured on the driving-shaft D next to the sprocket-wheel J, and on the face of the pulley is pivoted the eccentric $K'$, in contact at its periphery with the shaft D, the eccentric being pressed in such contact by a spring $K^2$. Over the pulley K passes a band $K^3$, connected at one end to a spring $K^4$, attached to the vehicle-body, and the other end of said band $K^3$ is connected with a hand-lever $K^5$ under the control of the operator and fulcrumed on the vehicle-body C.

It will be seen that when the operator moves the lever in the direction of the arrow $a'$ a pull is exerted on the band $K^3$ and the pulley K is rotated, and by the eccentric $K'$, which acts as a pawl on the shaft D, rotates the latter. When the operator releases the pressure on the lever $K^5$, the spring $K^4$ draws the lever and band, together with the pulley K, back to the former position, and then the eccentric glides over the shaft D without rotating the same. Several such movements given to the lever K rotate the shaft D and the combustion-chamber E sufficiently to start the engine, as previously mentioned.

In order to ignite the charge in the combustion-chamber at the proper time, I provide an igniting device. (Shown in detail in Figs. 6, 7, and 8.) This igniting device is provided with a contact-arm L, secured to the inner face of the side of the combustion-chamber opposite that in which the ports $a$ are located. The contact-arm L is adapted to be engaged by the points of the teeth of a contact-wheel $L'$, secured on the shaft $L^2$, mounted to turn in a bearing $L^3$, held in an insulated block $L^4$, secured in the side of the combustion-chamber E, as is plainly indicated in Fig. 7. The outer end of the shaft $L^2$ carries a star-wheel $L^5$, adapted to engage two sets of pins $L^6$ and $L^7$, projecting from an insulated plate $L^8$, secured on an arm $C^3$, attached to the frame $C'$, as is shown in Figs. 4 and 5. The pins $L^6$ and $L^7$ are connected by a wire with one end of a battery connected at its other end with the combustion-chamber, so that when the star-wheel $L^5$ moves in engagement with the set of pins $L^6$ $L^7$ the circuit is completed, and at the same time the star-wheel $L^5$ is turned and a rotary motion is given to the shaft $L^2$ and the contact-wheel $L'$, so that the points of its teeth by moving into and out of engagement with the contact-arm L produce sparks which ignite the charge in the chamber E. A spring-washer $L^9$ is held on the shaft $L^2$ to bear against the star-wheel $L^5$ to render the device as noiseless as possible and to take up wear. Two sets of pins $L^6$ $L^7$ are provided and located diametrically opposite each other, as is shown in Fig. 5, as two charges are ignited during each revolution of the combustion-chamber E.

When the combustion-chamber E is filled with the charge and the latter is ignited by the igniting device, as above described, the pistons $F'$ are simultaneously forced outward and rotary motion is given to the combustion-chamber E and the main driving-shaft D, as above described, to rotate the axle $B'$, so as to propel the vehicle forward or backward, according to the position of the clutch $J^5$. During the next inward stroke of the pistons $F'$ one of the ports $a$ registers with the exhaust-port $d$, so that the products of combustion pass out of the cylinders and the combustion-chamber to the outer air. During the next upward stroke of the pistons $F'$ one of the ports $a$ registers with either the port $b$ or the port $c$ to draw a new charge into the combustion-chamber, and during the following inward stroke of the pistons the drawn-in charge is compressed, and then when the pistons are beginning to start on their next outward stroke an ignition takes place and the above-described operation is repeated.

It is understood that during each stroke of the pistons $F'$ the wheel G makes one half-revolution and the combustion-chamber E makes one eighth-revolution, so that during one full revolution of the combustion-chamber two explosions take place. It is, however, understood that I do not limit myself to the number of cylinders employed, as it is evident that a two-cycle motor may be built on the principle above outlined. It is further evident that other suitable means may be employed for transmitting the reciprocating motion of the pistons F to a rotary motion of the gear-wheels G, and hence I do not limit myself to the levers $F^6$, links $F^8$, and crank-pins $G'$ shown and described.

In order to properly steer the vehicle, I provide the front axle $A'$ at its middle with an upwardly-extending rigid post $A^2$, carrying at its upper end a hand-wheel $A^3$, adapted to be taken hold of by the operator, so as to turn the front axle to steer the vehicle to either the right or the left. In order to hold the axle in the desired position after it is set by the operator turning the hand-wheel $A^3$, I provide the post $A^2$ with a ratchet-wheel $A^4$, engaged by a spring-pawl $A^5$, fastened in the bottom of the vehicle-body C and adapted to be pressed out of engagement with the said ratchet-wheel by the foot of the operator. Other suitable means may be employed for the same purpose.

In order to permit of conveniently turning the vehicle around curves without causing the rear wheels B to drag on the ground, I provide the following automatic device, (shown in Fig. 2:) The box $B^2$ of one wheel B is formed at its inner end with a cup-shaped extension $B^3$, adapted to be engaged by a cone N, normally pressed into the said extension by a spring $N'$, held on the axle B, said cone being mounted to slide on and to turn with the axle D, so that when the latter is rotated and the cone is in engagement with the extension $B^3$ then the wheel B is rotated. The cone N is adapted to be moved out of engagement with the extension $B^3$ and against the tension of the spring $N'$ by a lever $N^2$, fulcrumed on a bearing attached to the vehicle-body, the lever being provided with an arm $N^3$, connected by a limk $N^4$ with the front axle $A'$ alongside of the reaches O. When the front axle $A'$ is turned by the operator manipulating the hand-wheel $A^3$, as previously described, the link $N^4$ is pushed either forward or rearward, and in either case it acts, by means of the arms $N^3$, on the double lever $n^2$ to push the cone N out of engagement with the extension $B^3$, so that the wheel B is free to rotate loosely on the axle D. As soon as the front axle $A'$ again assumes its normal position on a straight run the link $N^4$, by acting on the lever $N^2$, permits the cone N to again engage the extension $B^3$, so as to turn the wheel B with the axle by means of the said cone.

The packing for each piston $F'$ is preferably as shown in Fig. 15, in which a sheet $F^9$ of asbestos is held in the piston-body by a compression-plate $F^{10}$, screwing on the piston-rod $F^2$. An oil-cup $F^{11}$ is held on the plate $F^{10}$ and discharges the lubricant onto the sheet $F^9$, which latter distributes the lubricant to the cylinder-well. The plate $F^{10}$ is beveled on the under side to press the asbestos sheet outwardly to firmly pack the cylinder.

It will be seen that by the arrangement described a vehicle-motor is produced which is comparatively simple and durable in construction, not likely to get out of order, and easily manipulated by the operator seated on the vehicle-body.

Having thus fully described my invention, I claim as new and desire to secure by Letters Patent—

1. A motor-vehicle, comprising a vehicle-body mounted on a front axle carrying front wheels and on a rear axle carrying rear wheels, a motor held on the vehicle-body and comprising a revoluble combustion-chamber, a main driving-shaft on which the combustion-chamber is fastened, a transmitting device between the said main driving-shaft and the rear axle, cylinders opening into the said combustion-chamber, a fixed internal gear-wheel, a series of gear-wheels in mesh with the said fixed gear-wheel, and an intermediate mechanism between the said pistons and the said series of gear-wheels, to rotate the latter, substantially as shown and described.

2. A motor-vehicle provided with a motor comprising a revoluble combustion-chamber, a series of cylinders opening into the said combustion-chamber, a fixed internal gear-wheel, a series of gear-wheels in mesh with the said fixed gear-wheel, and intermediate mechanism between the pistons of the said cylinders and the said series of gear-wheels, to rotate the latter, substantially as shown and described.

3. A motor-vehicle provided with a motor comprising a revoluble combustion-chamber, a series of cylinders opening into the said combustion-chamber, a fixed internal gear-wheel, a series of gear-wheels in mesh with the said fixed gear-wheel, intermediate mechanism between the pistons of the said cylinders and the said series of gear-wheels, to rotate the latter, and a support held on the said cylinders and carrying the said series of gear-wheels, substantially as shown and described.

4. A motor comprising a revoluble combustion-chamber, cylinders opening into the combustion-chamber, pistons in the cylinders, a fixed internal gear-wheel, gear-wheels meshing with the fixed wheels and provided with crank-pins, pivoted levers having one end connected to the piston-rods, and links connecting the other ends of the levers with the crank-pins of the said gear-wheels, substantially as described.

5. A motor comprising a revoluble combustion-chamber, cylinders opening into the said chamber, pistons in the cylinders, a fixed internal gear-wheel, wheels meshing with the internal gear-wheel and provided with crank-pins, levers fulcrumed between their ends and having their inner ends loosely connected with the piston-rods, and links connecting the outer ends of the levers with the crank-pins of the gear-wheels, substantially as described.

6. A motor-vehicle provided with a motor comprising a revoluble combustion-chamber, a series of cylinders opening into the said combustion-chamber, a fixed gear-wheel, a series of gear-wheels in mesh with the said fixed gear-wheel, intermediate mechanism between the pistons of the said cylinders and the said series of gear-wheels, to rotate the latter, and a fixed plate having inlet-ports and exhaust-ports adapted to register with ports in one end of the said combustion-chamber, substantially as shown and described.

7. A motor-vehicle provided with a motor comprising a revoluble combustion-chamber, a series of cylinders opening into the said combustion-chamber, a fixed gear-wheel, a series of gear-wheels in mesh with the said fixed gear-wheel, intermediate mechanism between the pistons of the said cylinders and the said series of gear-wheels, to rotate the latter, a fixed plate having inlet-ports and exhaust-ports adapted to register with ports in one end of the said combustion-chamber, and an oil-pump connected with the said inlet-port and adapted to be actuated from the said revolving combustion-chamber, substantially as shown and described.

8. A motor-vehicle provided with a motor comprising a main driving-shaft, a combustion-chamber secured on said shaft and provided with a series of ports in one end, a fixed plate having inlet and exhaust ports adapted to register with ports in the ends of the combustion-chamber, the inlet-port being connected with a suitable source of supply of the motive agent, a series of cylinders opening into the said combustion-chamber, pistons operating in the said cylinders, levers connected with the piston-rod of the pistons, gear-wheels having crank-pins connected with the said levers, and an internal fixed gear-wheel in mesh with the said gear-wheels, substantially as shown and described.

9. A motor-vehicle provided with a motor comprising a main driving-shaft, a combustion-chamber secured on said shaft and provided with a series of ports in one end, a fixed plate having inlet and exhaust ports adapted to register with ports in the ends of the combustion-chamber, the inlet-port being connected with a suitable source of supply of the motive agent, a series of cylinders opening into the said combustion-chamber, pistons operating in the said cylinders, levers connected with the piston-rod of the pistons, gear-wheels having crank-pins connected with the said levers, an internal fixed gear-wheel in mesh with the said gear-wheels, the said gear-wheels being supported on a ring fastened to the said cylinders, and an electric igniting device in the said combustion-chamber and adapted to be actuated when the combustion-chamber is rotating, substantially as shown and described.

10. A motor-vehicle provided with an electric igniting device comprising fixed insulated pins connected with one end of a battery, a a star-wheel adapted to engage the said pins, a contact-wheel secured on the shaft of the said star-wheel and extending within the combustion-chamber, and a fixed contact-plate adapted to be engaged at its free end by the points of the said contact-wheel, substantially as shown and described.

11. A motor-vehicle provided with an electric igniting device comprising fixed insulating-pins connected with one end of a battery, a star-wheel adapted to engage the said pins, a contact-wheel secured on the shaft of the said star-wheel and extending within the combustion-chamber, a fixed contact-plate adapted to be engaged at its free end by the points of the said contact-wheel, and a combustion-chamber mounted to turn and carrying the shaft for the said wheels, so that the combustion-chamber, in rotating, causes the star-wheel to make contact with the pins and to be rotated by the latter, substantially as shown and described.

HENRY W. HEATON.

Witnesses:
WILLIAM A. PHILLIPS,
ELVA M. CARPENTER.